(12) United States Patent
Matzka et al.

(10) Patent No.: US 10,363,638 B2
(45) Date of Patent: Jul. 30, 2019

(54) METHOD FOR CONTROLLING A SCREWING PROCESS

(71) Applicant: AUDI AG, Ingolstadt (DE)

(72) Inventors: Stephan Matzka, Ingolstadt (DE); Anton Schemmerer, Riedenburg/Jachenhausen (DE); André Blum, Gaimersheim (DE); Partho Rahman, Ingolstadt (DE)

(73) Assignee: Audi AG, Ingolstadt (DE)

( * ) Notice: Subject to any disclaimer, the term of this patent is extended or adjusted under 35 U.S.C. 154(b) by 371 days.

(21) Appl. No.: 15/211,660

(22) Filed: Jul. 15, 2016

(65) Prior Publication Data

US 2017/0014961 A1 Jan. 19, 2017

(30) Foreign Application Priority Data

Jul. 18, 2015 (DE) .................. 10 2015 009 395

(51) Int. Cl.
| | |
|---|---|
| *B23P 19/06* | (2006.01) |
| *B25B 21/00* | (2006.01) |
| *B25B 23/147* | (2006.01) |
| *G05B 19/4061* | (2006.01) |
| *G05B 19/418* | (2006.01) |

(52) U.S. Cl.
CPC ............ *B23P 19/066* (2013.01); *B25B 21/00* (2013.01); *B25B 23/147* (2013.01); *G05B 19/4061* (2013.01); *G05B 19/41805* (2013.01); *G05B 2219/45023* (2013.01); *Y02P 90/04* (2015.11)

(58) Field of Classification Search
CPC ......... B23P 19/066; B23P 19/06; B23P 19/00; G05B 19/4061; G05B 19/41805; G05B 2219/45023; Y02P 90/04; B25F 5/00; B25F 5/001; B23Q 3/15713; B25G 1/005; B25G 1/025; B25G 1/043; B25B 21/00; B25B 23/147; B25B 23/14
See application file for complete search history.

(56) References Cited

U.S. PATENT DOCUMENTS

| | | | |
|---|---|---|---|
| 4,161,221 A | 7/1979 | Carlin et al. | |
| 5,890,405 A * | 4/1999 | Becker | B25B 23/0064 |
| | | | 81/434 |

(Continued)

FOREIGN PATENT DOCUMENTS

| | | |
|---|---|---|
| CN | 101051744 A | 10/2007 |
| CN | 101466501 A | 6/2009 |

(Continued)

OTHER PUBLICATIONS

Chinese Search Report dated Jan. 12, 2018 with respect to counterpart Chinese patent application 2016105508519.

(Continued)

*Primary Examiner* — Shahed Ahmed

(74) *Attorney, Agent, or Firm* — Henry M. Feiereisen LLC

(57) ABSTRACT

A method for controlling a screwing process, includes during the screwing process screwing a screw into a component with an electrical screwing device; detecting during the screwing process an actual course of at least one process parameter of the screwing; testing whether the actual course has a pattern which predicts an error of the screwing process; and terminating the screwing process early when the actual course has said pattern.

10 Claims, 2 Drawing Sheets

(56) References Cited

U.S. PATENT DOCUMENTS

2010/0027979 A1* 2/2010 Matsunaga .............. B25F 5/00
388/811
2015/0127141 A1* 5/2015 Kawada ................ B25J 9/0087
700/206

FOREIGN PATENT DOCUMENTS

| CN | 101863004 A | 10/2010 |
| CN | 102528721 A | 7/2012 |
| DE | 43 09 016 | 9/1994 |
| DE | 197 36 547 | 2/1999 |
| DE | 102 55 177 | 6/2004 |
| DE | 10 2006 047 683 | 4/2008 |
| DE | 20 2008 018 265 | 8/2012 |
| JP | H 7-290370 | 11/1995 |
| JP | 2014-124717 | 7/2014 |
| WO | WO 2010/066375 | 6/2010 |

OTHER PUBLICATIONS

Translation of Chinese Search Report dated Jan. 12, 2018 with respect to counterpart Chinese patent application 2016105508519.

* cited by examiner

METHOD FOR CONTROLLING A SCREWING PROCESS

CROSS-REFERENCES TO RELATED APPLICATIONS

This application claims the priority of German Patent Application, Serial No. 10 2015 009 395.9, filed Jul. 18, 2015, pursuant to 35 U.S.C. 119(a)-(d), the content of which is incorporated herein by reference in its entirety as if fully set forth herein.

BACKGROUND OF THE INVENTION

The present invention relates to a method for controlling a screwing process and a system for controlling a screwing process.

The following discussion of related art is provided to assist the reader in understanding the advantages of the invention, and is not to be construed as an admission that this related art is prior art to this invention.

The production of a technical device usually involves fastening two components to each other by means of a screw. For this purpose the screw is screwed tight at at least one of the components. Achieving an error-free screw connection requires adhering to certain parameters that cause a movement of the screw.

It would be desirable and advantageous to provide an improved method and system for controlling a screwing process.

SUMMARY OF THE INVENTION

According to one aspect of the present invention, a method for controlling a screwing process, includes during the screwing process screwing a screw into a component with an electrical screwing device; detecting during the screwing process an actual course of at least one process parameter of the screwing; testing whether the actual course has a pattern which predicts an error of the screwing process; and terminating the screwing process early when the actual course has said pattern The method according to the invention is provided for controlling a screwing process, in which a screw is screwed into a component with an electrical screwing device. During the screwing process an actual course of at least one process parameter is detected and it is tested whether the actual course has a pattern that predicts or prognosticates or forecasts an error prior to a usual occurrence of the error. The screwing process is automatically prematurely interrupted when the actual course of the process parameter has this pattern that predicts the error. When no such pattern is detected the screwing process is continued until it is finished as intended.

According to another advantageous feature of the invention, the actual course of the process parameter detected during the screwing process is compared with at least one erroneous course of an erroneous screwing process, which has the pattern that has occurred prior to the occurrence of the error, wherein the pattern is identified in the actual course of the process parameter when during the time interval the actual course of the process parameter substantially corresponds to the erroneous course of the erroneous screwing process.

In this case the at least one erroneous course of the erroneous screwing process is deduced from at least one erroneous course detected during a prior erroneous screwing process. Hereby it is provided that the error has actually occurred during the erroneous screwing process. The erroneous course results from an actual course of a corresponding process parameter, which was determined during the erroneous screwing process. In the method the erroneous course associated with this erroneous screwing process is used as an example for predicting the error in a subsequent screwing process for comparison.

In addition the actual course of the process parameter detected during the screwing process is compared with at least one target course of the process parameter for an error-free screwing process, wherein the pattern in the actual course is additionally verified when the actual course deviates from the target course by a tolerance value.

The at least one process parameter is for example a torque of the electrical screwing device.

According to another advantageous feature of the invention, at least one erroneous course, which has resulted already and/or before during performance of the screwing process by at least one of a plurality of electrical screwing devices, is transmitted by the at least one electrical screwing device to a central higher-level data processing unit in real time, is analyzed by the higher-level central processing device in real time and is transmitted to all electrical screwing devices in real time. Herby it is taken into account that this at least one erroneous course has resulted during performance of a screwing process by the at least one screwing device, wherein the error has occurred and has lead to termination of this erroneous screwing process.

The system according to the invention is configured for controlling a screwing process in which a screw is screwed into a component with an electrical screwing device. The system includes at least one sensor and at least one control unit. The at least one sensor is configured to detect an actual course of at least one process parameter during the screwing process. The at least one control unit is configured to test whether the actual course of the at least one process parameter has a pattern, which predicts or prognosticates or forecasts an error of the screwing process. In addition the at least one control unit is configured to prematurely terminate the screwing process when the actual course of the at least one process parameter has this pattern. Hereby for example operation of a motor of the screwing device is stopped by a control unit when the pattern occurs.

The at least one control unit can be arranged in the screwing device.

As an alternative or in addition the at least one control unit can be arranged outside the screwing device and is connected with the screwing device for exchanging data with the screwing device. When the system has a control unit arranged in the screwing device and a control unit arranged outside the screwing device, the control units are connected with each other for exchanging data with each other.

According to another advantageous feature of the invention, the at least one control unit can include a data processing unit or processing unit.

According to another advantageous feature of the invention, the at least one control unit can include a data memory in which at least one erroneous course of the at least one process parameter that was detected beforehand during an erroneous screwing process and/or at least one target course of the at least one process parameter that was detected during an error-free screwing process is stored.

According to another advantageous feature of the invention, the system may also include a central higher-level data processing unit, which is connected with multiple screwing devices for exchanging data with the multiple screwing devices.

With the method and the system it is possible to categorize a potentially erroneous screwing process as erroneous or improper by early prediction of an error and to terminate the screwing process. Among other things this saves mounting time and/or helps to avoid post-processing.

By predicting a potentially occurring error in real time in an early phase of a screwing process it can already be prognosticated at an early time point whether the actually performed screwing process that is subject to the control will be erroneous and thus improper or erroneous or error-free and thus proper at a later time point and thus a later phase. When a future occurrence of an error during the screwing process is prognosticated the screwing process is immediately terminated.

An immediate termination of a screwing process that was identified as erroneous early on helps avoiding spending further futile manufacturing time and results in placement of a new screw and performing a new screwing process, which thus saves manufacturing time. Hereby time constraints on assembling staff who perform the screwing process is reduced because the mounting personnel now have more time to repeat a connection between the screw and the component. This helps avoiding increased costs resulting from a new screw or even inserting a component that has been damaged due to an error.

According to another advantageous feature of the method according to the invention, actual courses of at least one process parameter are detected. When a screwing process ends with an error an erroneous actual course is deduced from the actual course of the process parameter resulting therefrom. By analyzing data (data mining) of already detected erroneous courses of erroneous screwing processes, relevant features in the erroneous courses are determined which in the further course of such an erroneous screwing process usually lead to an error and a termination resulting therefrom. Hereby the at least one erroneous course is learned by an algorithm from erroneous courses for erroneous screwing processes that were detected in the past by taking meta information into account.

Comparing the at least one process parameter actually detected during the actual screwing process with the at least one erroneous course, that has a pattern which resulted in an erroneous course determined in a prior screwing process that had to be terminated due to an occurring error, makes it possible to predict this error early on and thus prevent this error by early termination of the screwing process.

It is also possible to constantly train and teach at least one algorithm by analyzing erroneous courses of screwing processes that ended with errors, which makes it possible to also detect changes of the screwing process to be performed or changes that are based on replacement of the screwing device. With the at least one algorithm screwing processes are constantly monitored in real time.

The at least one erroneous course, the at least one target course and the at least one algorithm for data analysis are stored in the form of an analysis software in the at least one control unit inside or outside the screwing device. Hereby the at least one data processing unit is arranged in the control unit of the screwing device and/or in a computer outside the screwing device, wherein the computer and the screwing device are assigned to each other.

The at least one data processing unit may be arranged in a downstream data processing system or IT-system. The at least one data processing unit arranged outside the control device is usually connected with a plurality of screwing devices and is configured to analyze actual courses of the at least one process parameter detected from this plurality of screwing devices during an entire mounting process.

According to another advantageous feature of the invention, actual courses of the at least one process parameter are analyzed and/or evaluated which have resulted during screwing processes in which an error has actually occurred. Such information regarding detected actual courses of the at least one process parameter are transmitted with the at least one data processing unit outside the screwing device or the plurality of screwing devices, analyzed and transmitted during operation to the at least one control unit of at least one of the screwing devices in real time, wherein at least one newly detected and/or updated erroneous course is directly transmitted to the at least one screwing device.

Regarding the data processing or IT technology the at least one higher-level data processing unit outside the screwing device is configured as so-called Hadoop Cluster which is capable to store and analyze a large amount of data in real time. Hereby data or information for describing erroneous courses are provided to the control unit of the at least one screwing device in real time.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
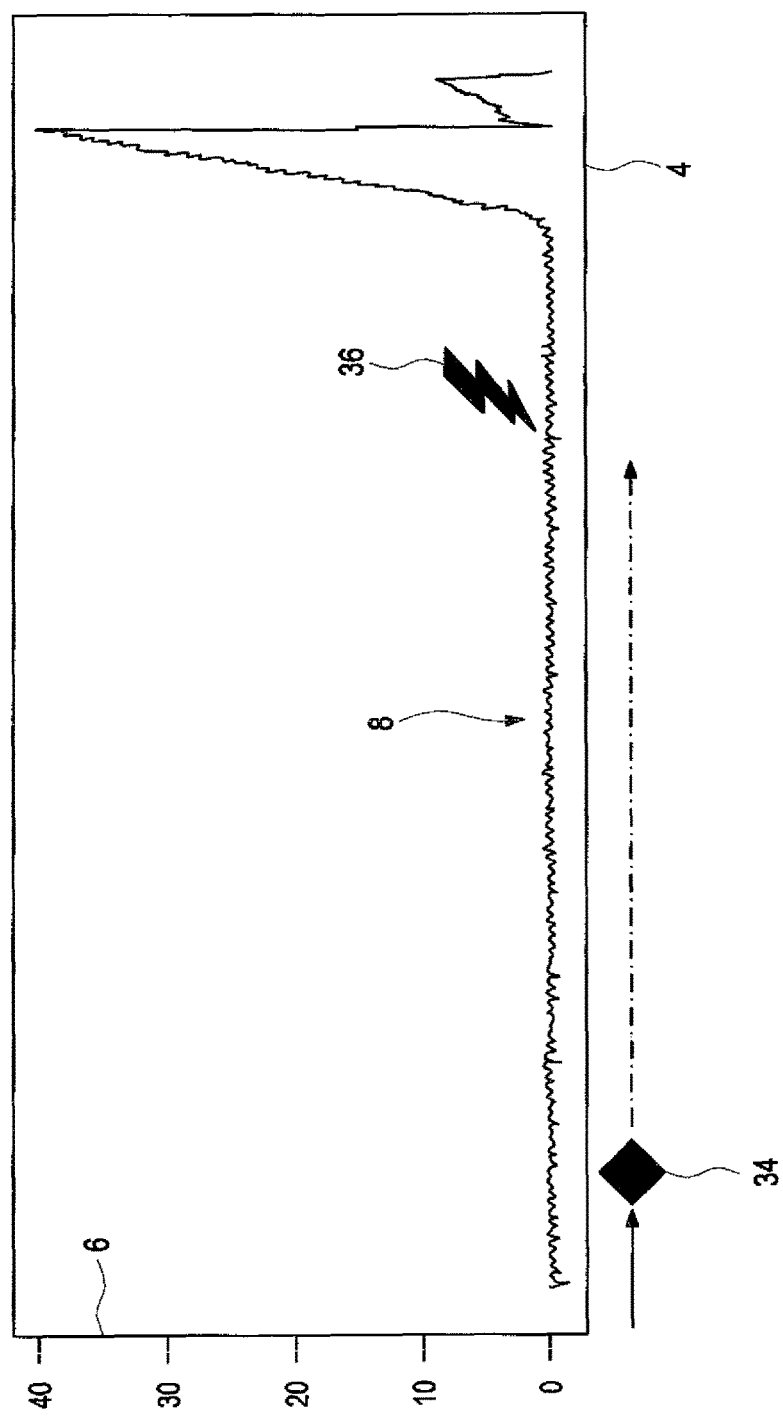
FIG. 1 shows a diagram of an embodiment of the method according to the invention.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
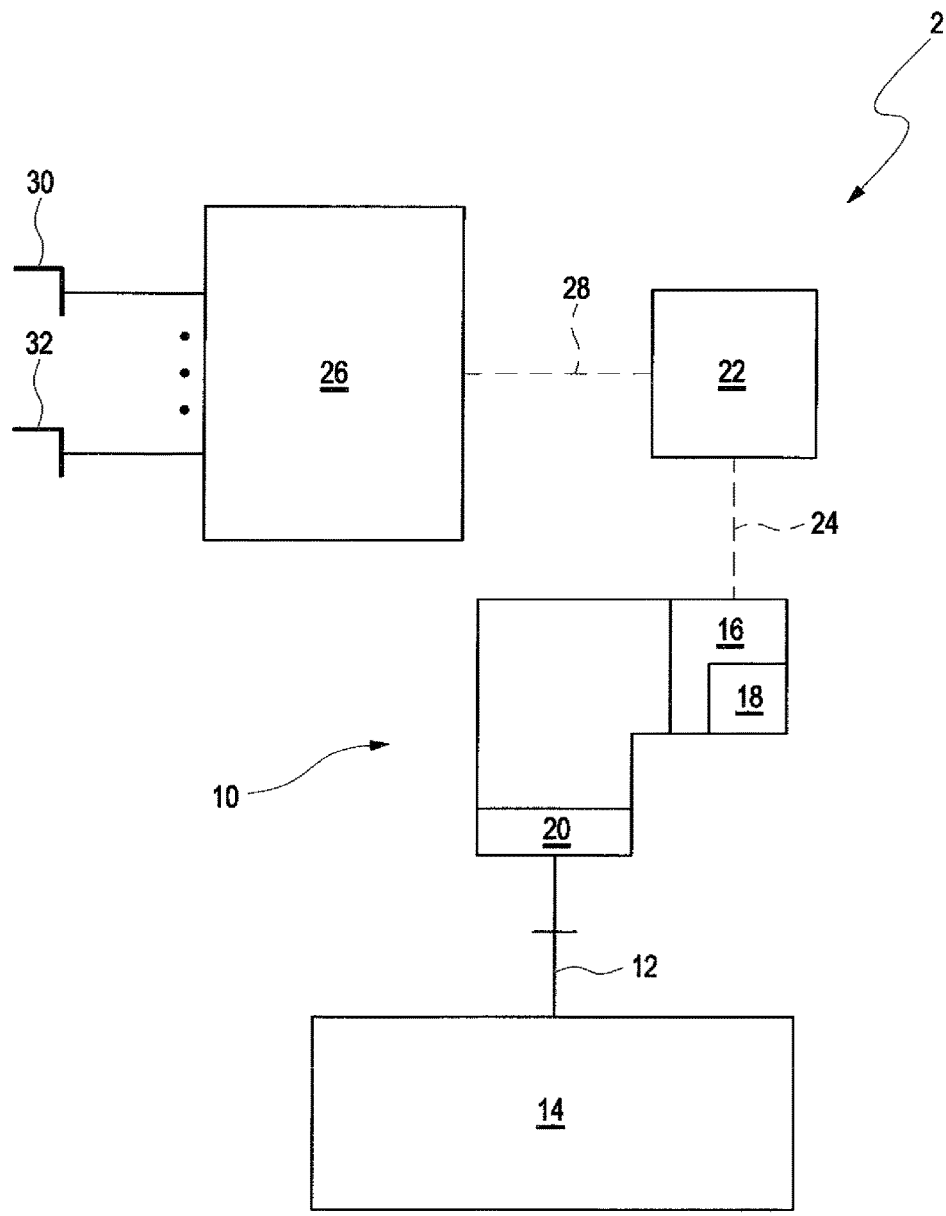
FIG. 2 shows a schematic representation of an embodiment of the system according to the invention.

The diagram of FIG. 1 for performing the embodiment of the method according to the invention with the system 2 schematically shown in FIG. 2, includes an abscissa 4 on which the time is plotted, and an ordinate 6 on which an actual course 8 of a process parameter, here a torque, of an electric screwing device 10 of the system 2 is plotted, which results in an actually performed screwing process.

When performing the screwing process, a screw 12 can be screwed into a component 14 with the screwing device 10. The screwing device 10 includes a control unit 16 which includes a data processing unit 18 internal to the screwing device, and a sensor 20 for detecting at least one process parameter during the screwing process.

FIG. 2 further shows a first data processing unit 22, which in the illustrated embodiment is arranged outside the screwing device 10 and is connected with the screwing device 10 via a connection 24 for exchanging data. This first data processing unit 22 outside of the screwing device 10 is connected with a second higher-level data processing device 26 also via a connection 28 for exchanging data.

Beside the screwing device 10 shown in detail in FIG. 2 the embodiment of the system 2 also includes a further screwing device 30, 32, which although being depicted smaller, includes the same components as the first screwing device 10. Hereby this first at least one further screwing device 30, 32 is connected with the second higher-level data processing unit 26. All screwing devices 10, 30, 32 are connected with each other via this higher-level central data processing unit 26.

During assembly of a plurality of components 14 by performing multiple screwing processes, all screwing devices 10, 30, 32 detect with sensors process parameters and transmit the process parameters in real time to the central higher-level data processing unit 26, which analyzes the process parameters. In an embodiment the actual courses of respective process parameters that accompany the screwing processes are analyzed in which during a respective erroneous screwing process an error has occurred in real time.

In an analysis of such an erroneous actual course of at least one process parameter it is tested whether this process parameter has a pattern 34, wherein the error 36 has occurred during the erroneous screwing process only after the pattern 34. Hereby it is conceivable that the pattern 34 and the error 36 are connected with each other or are correlated with each other, wherein the error 36 has resulted during the screwing process at a time point after the pattern 34 has occurred.

A plurality of erroneous courses that were sensed by the screwing devices 10, 30, 32 are analyzed by the central higher-level data processing unit and are subsequently transmitted to the control units 16 of the screwing devices 10, 30, 32 in real time, wherein a respective one of such erroneous course is to be understood and/or used as a negative example for a correct target course of a corresponding process parameter.

In a screwing process actually performed by the screwing device 10 the actual course 8 of the process parameter detected during operation is compared with at least one erroneous course. When such a comparison shows that the pattern 34 occurs during the actual course 8, the screwing process is immediately automatically terminated before the error 36 that is expected based on the pattern even occurs. It is thus possible within the framework of the method to predict the error 36 in time and/or early by detecting the pattern 34 in the actual course 8 and to avoid the error by terminating the screwing process.

What is claimed as new and desired to be protected by Letters Patent is set forth in the appended claims and includes equivalents of the elements recited therein:

What is claimed is:

1. A method for controlling a screwing process, comprising:
    during the screwing process screwing a screw into a component with an electrical screwing device;
    detecting during the screwing process an actual course of at least one process parameter of the screwing;
    testing whether the actual course has a pattern indicating an abrupt spike in torque later in the screwing process, which pattern predicts an error of the screwing process;
    terminating the screwing process early when the actual course has said pattern;
    placing of a new screw; and
    performing a new screwing process.

2. The method of claim 1, further comprising comparing the actual course detected during the screwing process with at least one erroneous course of an erroneous screwing process that has the pattern which has occurred during the erroneous screwing process prior to an occurrence of an error in the erroneous screwing process, wherein the pattern is identified in the actual course when the actual course corresponds to the erroneous course at least during a time interval.

3. The method of claim 2, wherein the at least one erroneous course of the erroneous screwing process is deduced from at least one other erroneous course which was detected during another erroneous screwing process performed prior to the erroneous screwing process.

4. The method of claim 1, further comprising performing multiple said screwing process with multiple respective screwing devices, transmitting at least one erroneous course resulting during at least one of the multiple screwing processes respectively from at least one of the multiple, screwing devices screwing from the at least one electrical screwing device to a central higher-level data processing unit in real time, analyzing the at least one erroneous course by the central higher-level data processing unit in real time and transmitting the at least one erroneous course all of the multiple electrical screwing devices in real time.

5. A system for controlling a screwing process in which a screw is screwed by an electrical screwing device into a component, said system comprising:
    at least one sensor configured to detect during the screwing process an actual course of at least one process parameter of the screwing process; and
    at least one control unit configured to test whether the actual course has a pattern indicating an abrupt spike in torque later in the screwing process, which pattern predicts an error of the screwing process, to prematurely terminate the screwing process when the actual course has said pattern, to place a new screw and to perform a new screwing process.

6. The system according to claim 5, wherein the at least one control unit is arranged in the screwing device.

7. The system of claim 5, wherein the at least one control unit is arranged outside of the screwing device and is in data communication with the screwing device.

8. The system of claim 5, wherein the at least one control unit includes a data processing unit.

9. The system of claim 5, wherein the at least one control unit includes a data memory, in which at least one erroneous course of the at least one process parameter that has occurred in an erroneous screwing process is stored.

10. The system of claim 5, further comprising a central higher-level data processing unit in data communication with multiple electrical screwing devices.

* * * * *